July 2, 1929.  J. C. DAWLEY ET AL  1,719,691
BRAKE MECHANISM
Filed May 10, 1926

INVENTORS.
JAMES C. DAWLEY.
ION V. K. HOTT.
BY Edward H Reed
ATTORNEY

Patented July 2, 1929.

1,719,691

UNITED STATES PATENT OFFICE.

JAMES C. DAWLEY AND ION V. K. HOTT, OF DAYTON, OHIO, ASSIGNORS TO THE JOYCE-CRIDLAND COMPANY, OF DAYTON, OHIO, A CORPORATION OF OHIO.

BRAKE MECHANISM.

Application filed May 10, 1926. Serial No. 107,973.

This invention relates to a brake mechanism and is designed more particularly for use in connection with lifting devices, such as the well known self-lowering jack in which the load moves downwardly under its own weight and this downward movement is controlled by a brake.

One object of the invention is to provide an improved means for positively controlling the movement of the load.

A further object of the invention is to provide a brake actuating device which will normally hold the friction elements yieldingly in contact with the brake drum and which will comprise means for positively retaining the friction elements in contact with the brake drum so as to lock the load against downward movement.

A further object of the invention is to provide such a device in which the positive locking means will be independent in its operation of the means for yieldably pressing the friction elements into engagement with the brake drum.

Other objects of the invention will appear as the device is described in detail.

Figure 1:
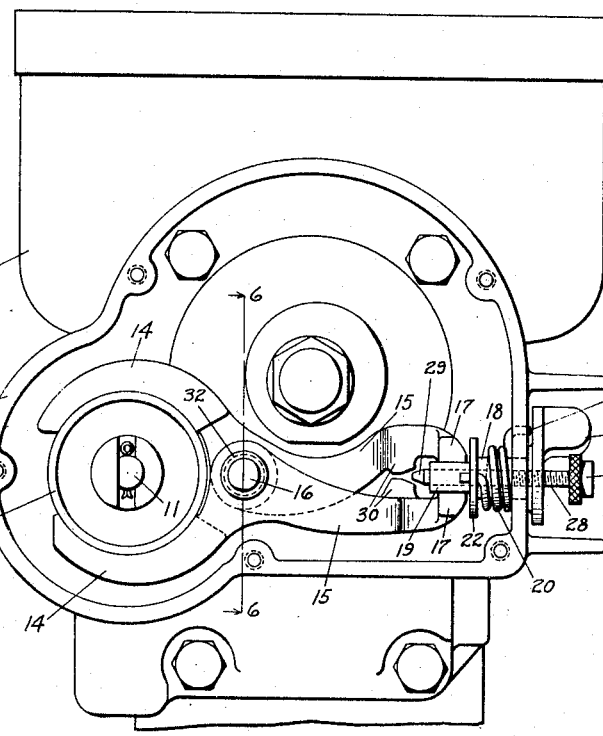
Figure 2:
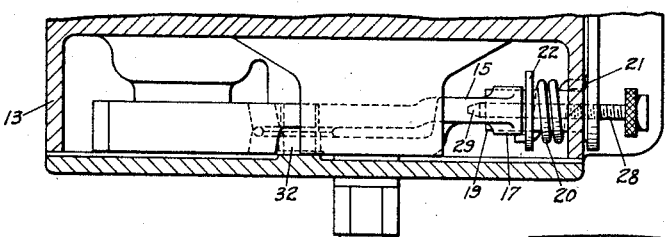
Figure 6:
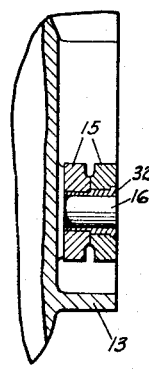
Figure 3:
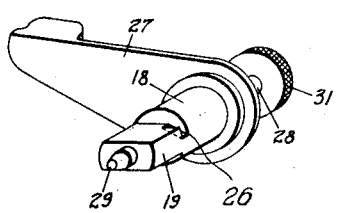
Figure 5:
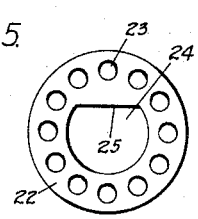
Figure 4:
Figure 4:
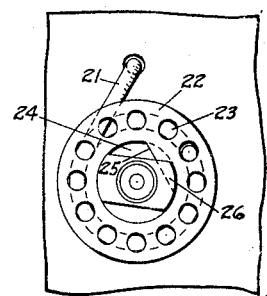

In the accompanying drawings Fig. 1 is a side elevation of the upper portion of a jack equipped with our invention, the cover plate being removed to show the brake mechanism in elevation; Fig. 2 is a transverse sectional view showing the brake mechanism in plan; Fig. 3 is a detail view of the actuating device and lock for the friction members; Fig. 4 is an end elevation of the actuating device for the lock; Fig. 5 is an elevation and edge view of the washer forming part of the actuating device; and Fig. 6 is a sectional detail view of the pivotal mounting for the arms of the friction members.

In these drawings we have illustrated one embodiment of our invention and have shown the same as applied to a self-lowering jack of the type shown in Patent No. 1,344,117, granted June 22, 1920 to Ripsch, Dawley and Derby, but it will be understood that the brake may be applied to mechanisms of various kinds and may take various forms without departing from the spirit of the invention.

As shown in the present drawings, a rotatable brake member or brake drum 10 is rigidly secured to a shaft 11 which in turn is so connected with the lifting element of the jack, a portion of which is shown at 12, that the downward movement of the lifting element will rotate the brake drum. We have not here illustrated the connections between the brake drum and the lifting element but these may be of any suitable character and one form of the same is illustrated in the above mentioned patent. The brake drum and its associated mechanism, which is to be hereinafter described, are mounted in a housing 13 carried by the jack and, in the present instance, formed integral with the main housing of the jack. Cooperating with the brake member are two friction members or brake shoes 14 arranged to frictionally engage the brake member and control its rotation. Rigidly connected with the friction members 14 are two arms 15 which are pivotally mounted in a stud 16. These arms do not intersect but are so arranged that when their forward ends are separated the friction members 14 will be pressed into contact with the rotatable brake member. The outer ends of the arms 15 are engaged by a spring actuated device which tends to separate them and thus cause the friction members to operatively engage the brake member and to hold the same normally in engagement therewith. Means are provided to relieve the friction members of this spring pressure when it is desired to lower the load. As here shown, the forward ends of the arms are provided with parts 17 of greater width than the arms and having opposed contact surfaces between which is located the actuating member, which is preferably in the form of a cam. In the present construction the actuating member comprises a stud 18 which is rotatably mounted in the side wall of the housing 13 and has its inner end portion flattened, as shown at 19, to constitute a cam, and located between the contact surfaces of the arms 15, so that the rotation of the stud will spread the arms apart and cause the friction members or brake shoes 14 to operatively engage the brake drum. A spring 20 acts on the stud to rotate the same in a direction to spread the arms and, in the present construction, this spring is coiled about the stud just inside the side wall of the housing and has one end secured to the housing, as shown at 21, and has its other end secured to a disk 22 which is shown as provided with a series of openings 23, any one of which is adapted to receive the end of the spring, thus permitting of an adjustment between the spring and the disk. This disk has a central opening 24 of a sufficient diameter to permit the disk to be slipped over the flat end of the stud but one edge of the opening is flat, as shown at 25, and when the disk is rotated with relation to the stud the flat edge of the opening will enter a recess 26 formed at the outer end of the flattened portion of the stud adjacent to the cylindrical portion thereof, thus serving to check the rotatory movement of the disk with relation to the stud and also serving to hold the disk against lengthwise movement with relation to the stud. Consequently the action of the spring on the disk will impart rotatory movement to the stud. This manner of connecting the spring with the stud not only provides a very efficient operation but it provides a structure which is very easily assembled and disassembled and greatly facilitates the renewal of the spring when the jack is in service. Rigidly secured to this stud outside the supplemental housing is an actuating lever 27, by means of which the stud may be rotated against the action of the spring to move the cam 19 into an inoperative position and release the brake member from the action of the friction device. The action of the spring actuated device on the friction device is sufficient to hold the brake member normally against rotation due to the weight of the load on the lifting element but should the spring weaken or break the load will slip or drop quickly, thus placing the workman in danger. In order to positively lock the lifting element against downward movement we have provided means for positively holding the friction members in contact with the brake member or drum, this means preferably comprising a locking device which engages the relatively movable parts or arms of the friction device with a wedging action which will move the friction device into operative contact with the brake member and retain the same in that position independent of the spring. As here shown, this locking member comprises a screw 28 which extends through and has screw threaded engagement with the stud 18. The inner end of the screw extends beyond the inner end of the stud and has a tapered or wedge shaped portion 29 which contacts with the inner edges of the arms 15, these arms being preferably provided with portions shaped to provide a tapered recess, as shown at 30, into which the tapered end of the screw or plunger enters. The outer end of the screw projects beyond the lever 27 and has connected therewith a knob or hand wheel 31 for manipulating the same. It will be apparent therefore that when the screw threaded plunger is moved inwardly it will engage the arms, spread the same apart and cause the friction members 14 to firmly grip the brake member, this being accomplished independently of the action of the spring 20, and will positively retain the friction members in their operative positions. The stud 18 is slidably mounted in its bearing in the wall of the housing and its outward movement is limited by the action of the coiled spring 20. When the screw threaded plunger engages the arms of the friction members the continued rotation thereof will tend to force the stud outwardly against the action of the spring and the pressure of this spring will be exerted against the arms, with increasing force, but when the stud has been moved out far enough to compress the coils of the spring into contact one with the other the spring will form a positive stop which will prevent the further outward movement of the stud.

The two arms 15 which carry the friction members may be mounted on the stud 16 in any suitable manner. Preferably one of these arms is offset so that its end portion will lie in substantially the same vertical plane with the corresponding portion of the other arm. The arm having this offset portion has mounted therein a bushing 32 the end of which extends beyond one side of the arm and which is journaled on the stud 16, and the second arm 15 is journaled on the projecting portion of the bushing 32. This bushing provides a relatively long bearing to receive the twisting strains to which the arm is subjected, due to the offset portion thereof and, further, the construction enables the arms to be assembled as a unit and then applied to the stud 16.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In a mechanism of the character described, the combination with a rotatable brake member, a friction device to cooperate with said brake member, and a pivoted arm connected with said friction device, of a device acting on said arm to normally control the position of said friction device, and a device operable independently of said controlling device to positively retain said friction device in engagement with said brake member.

2. In a mechanism of the character described, the combination with a rotatable brake member, a friction device to cooperate with said brake member, and a pivoted arm connected with said friction device, of a yieldable device acting on said arm to normally hold said friction device in engagement with said brake member, means for moving said friction device against the action of said yieldable device, and a locking device operable independently of said yieldable device to positively retain said friction device in engagement with said brake member.

3. In a mechanism of the character described, the combination with a rotatable brake member, a friction device to cooperate with said brake member, and a pivoted arm connected with said friction device, of a spring actuated device acting on said arm to normally hold said friction device in engagement with said brake member, means for moving said spring actuated device against the action of its spring, and a screw operated device acting on said arm to lock said friction device against movement.

4. In a mechanism of the character described, the combination with a rotatable brake member, a friction device comprising contact members to engage said brake member, and pivoted arms connected with the respective contact members to control their engagement with said brake member, of a spring actuated device acting on said arms to normally hold the same in separated positions with said friction members in contact with said brake members, means to move said spring actuated device against the action of its spring to release said brake member, and a device operable independently of said spring actuated device to lock said arms against movement.

5. In a mechanism of the character described, the combination with a rotatable brake member, a friction device comprising contact members to engage said brake member, and pivoted arms connected with the respective contact members to control their engagement with said brake member, of a cam engaging said arms, yieldable means acting on said cam to normally hold said arms in separated positions, and a device operable independently of said cam to positively hold said arms against movement.

6. In a mechanism of the character described, the combination with a rotatable brake member, a friction device comprising contact members to engage said brake member, and pivoted arms connected with the respective contact members to control their engagement with said brake member, of a rotatable stud having a cam shaped portion arranged between said arms, a spring acting on said stud to cause said cam shaped portion to separate said arms, and a locking device mounted in said stud and movable relatively thereto into and out of engagement with said arms.

7. In a mechanism of the character described, the combination with a rotatable brake member, a friction device comprising contact members to engage said brake member, and pivoted arms connected with the respective contact members to control their engagement with said brake member, a rotatable stud having a flattened end portion arranged between said arms and having a recess at the outer end of said flattened portion thereof, a disk having an opening to receive the flattened portion of said stud and having one edge of said opening arranged to enter said recess when said disk is rotated on said stud, a spring coiled about said stud and connected at one end with said disk and at its other end with a fixed support, and means for rotating said stud against the action of said spring.

8. In a mechanism of the character described, the combination with a rotatable brake member, a friction device comprising contact members to engage said brake member, and pivoted arms connected with the respective contact members to control their engagement with said brake member, and a housing enclosing said brake member and said friction device, of a stud rotatably mounted in the wall of said housing and having its inner end flattened on both sides and arranged between the ends of said arms, one corner of the flattened portion of said stud being cut away to form a recess adjacent to the body of said stud, a disk having an opening to receive the flattened end of said stud, one edge of said opening being flat and adapted to enter said recess when said disk is rotated with relation to said stud and thus hold said disk against both rotatory and longitudinal movement with relation to said stud, a spring coiled about said stud and connected at one end with said disk and at the other end with said housing, and means for rotating said stud against the action of said spring.

9. In a mechanism of the character described, the combination with a rotatable brake member, a friction device comprising contact members to engage said brake member, and pivoted arms connected with the respective contact members to control their engagement with said brake member, and a housing enclosing said brake member and said friction device, of a stud rotatably mounted in the wall of said housing having its inner end flattened on both sides and arranged between the ends of said arms, one corner of the flattened portion of said stud being cut away to form a recess adjacent to the body of said stud, a disk having an opening to receive the flattened end of said stud, one edge of said opening being flat and adapted to enter said recess when said disk is rotated with relation to said stud and thus hold said disk against both rotatory and longitudinal movement with relation to said stud, a spring coiled about said stud and connected at one end with said disk and at the other end with said housing, means for rotating said stud against the action of said spring, a plunger extending longitudinally through said stud, having screw threaded engagement therewith and having its inner end arranged to engage the adjacent edges of said arms with a wedging action, and means for rotating said plunger.

10. In a mechanism of the character described, the combination with a rotatable brake member, a friction device comprising contact members to engage said brake member, and pivoted arms connected with the respective contact members to move the same into and out of engagement with said brake member, of a rotatable stud having a part to engage said arms, a spring acting on said stud to cause the same to hold said arms normally in separated positions, means for moving said stud against the action of said spring to release said arms, and a part extending through said stud and movable relatively thereto into engagement with said arms to positively hold the same in separated positions.

11. In a mechanism of the character described, the combination with a rotatable brake member, a friction device comprising contact members to engage said brake member, and pivoted arms connected with the respective contact members to control their engagement with said brake member, and a housing enclosing said brake member, said friction device and said arms, of a spring actuated device mounted in the wall of said housing and having a part acting on said arms to normally hold said contact members in engagement with said brake members, means arranged exteriorly of said housing to move said spring actuated device against the action of its spring, a member extending through said spring actuated device, having screw threaded connection therewith and movable relatively thereto into locking engagement with said arms.

In testimony whereof, we affix our signatures hereto.

JAMES C. DAWLEY.
ION V. K. HOTT.